(12) United States Patent
Nair (10) Patent No.: US 9,378,082 B1
(45) Date of Patent: Jun. 28, 2016

(54) DIAGNOSIS OF STORAGE SYSTEM COMPONENT ISSUES VIA DATA ANALYTICS

(71) Applicant: EMC Corporation, Hopkinton, MA (US)

(72) Inventor: Sudhakaran Nair, Fremont, CA (US)

(73) Assignee: EMC Corporation, Hopkinton, MA (US)

(*) Notice: Subject to any disclaimer, the term of this patent is extended or adjusted under 35 U.S.C. 154(b) by 219 days.

(21) Appl. No.: 14/143,981

(22) Filed: Dec. 30, 2013

(51) Int. Cl.
*G06F 11/00* (2006.01)
*G06F 11/07* (2006.01)

(52) U.S. Cl.
CPC .................................. *G06F 11/079* (2013.01)

(58) Field of Classification Search
USPC ........................................................ 714/47.1
See application file for complete search history.

(56) References Cited

U.S. PATENT DOCUMENTS

| | | | |
|---|---|---|---|
| 7,437,615 B2 | 10/2008 | Iwamitsu et al. | |
| 8,547,107 B2 | 10/2013 | Abe et al. | |
| 2006/0200705 A1* | 9/2006 | Burger | G06F 11/0757 714/47.1 |
| 2007/0220371 A1* | 9/2007 | Duyanovich | G06F 11/3447 714/49 |
| 2008/0168302 A1 | 7/2008 | Cagno et al. | |
| 2012/0042214 A1* | 2/2012 | Jacobs | G06F 11/008 714/47.2 |
| 2013/0275814 A1* | 10/2013 | Nayak | G06F 11/3006 714/47.2 |
| 2014/0058689 A1* | 2/2014 | Klien | H04L 63/14 702/60 |

* cited by examiner

*Primary Examiner* — Sarai Butler
(74) *Attorney, Agent, or Firm* — BainwoodHuang (57) ABSTRACT

An improved technique involves mapping differences between current data collected from a component and previous data collected from the component to anomalous behavior of the component. A central diagnosis server collects previous state data such as disk or CPU utilization from components of various data storage systems it supports. The server may store this data, indexed by identifiers such as events linked to the state data, in a central database for later reference. The server then compares current state data being received from a particular data storage system to previous state data stored in the database. In some arrangements, the server selects previous state data based on matching event identifiers corresponding to the current state data and previous state data. The central diagnosis server then determines anomalous behavior based on the difference between current and previous state data.

24 Claims, 6 Drawing Sheets

DIAGNOSIS OF STORAGE SYSTEM COMPONENT ISSUES VIA DATA ANALYTICS

BACKGROUND

Data storage systems contain components such as disk arrays for storing any amount of data and storage processors for processing commands related to reading or writing data stored in the disk arrays. As with any system of even moderate complexity, there is a risk that a component within the data storage system may behave erratically or fail. For example, a disk in an array may exhibit increased access times or a storage processor may suddenly go offline. A system administrator of a data storage system may contact a technical support department upon the discovery of an issue with a system component.

A technical support department of a system vendor implements technical support procedures to diagnose root causes of issues with components of the systems they support. Conventional technical support procedures involve manually collecting information about the component. For example, technical support personnel may remotely access configuration information about the component. The technical support personnel may then compare this information with that found in, e.g., best practices documentation, to produce a diagnosis.

SUMMARY

Unfortunately, there are deficiencies with the above-described conventional technical support procedures. For example, manually collecting information is a very slow and unreliable way to diagnose the root cause of a problem.

In contrast with the above-described conventional technical support procedures that are slow and unreliable, an improved technique involves mapping differences between current data collected from a component and previous data collected from the component to anomalous behavior of the component. A central diagnosis server collects previous state data such as disk or CPU utilization from components of various data storage systems it supports. The server may store this data, indexed by identifiers such as events linked to the state data, in a central database for later reference. The server then compares current state data being received from a particular data storage system to previous state data stored in the database. In some arrangements, the server selects previous state data based on matching event identifiers corresponding to the current state data and previous state data. The central diagnosis server then determines anomalous behavior based on the difference between current and previous state data.

Advantageously, the improved technique provides a much faster and more reliable path to determining the root cause of a problem. Data analytics provides the capability to link events occurring at a component of a data storage system to state data for that component. Such linkages, when stored in a persistent database, enable automatic comparisons between the performances of the same components of different storage systems. Further, because these diagnoses occur automatically, the central diagnosis server may provide diagnoses proactively before an issue is even observed or reported.

One embodiment of the improved technique is directed to a method of diagnosing a root cause of a problem in a component of a data storage system. The method includes collecting current state data of the component in the data storage system over a current period of time, the current state data indicating a current state of the component at instants of time within the current period of time, the current state of the component at an instant of time being defined by current values of parameters of a set of parameters that describe the component. The method also includes extracting, from storage, previous state data of the component in other data storage systems over a previous period of time, the previous state data indicating a previous state of the component at instants of time within the previous period of time, the previous state of the component at an instant of time being defined by previous values of the parameters. The method further includes performing a comparison operation on the current state data and previous state data, the comparison operation generating a comparison result that indicates a difference between i) the current values of parameters over several of the instants of time within the current period of time and ii) the previous values of the parameters over several of the instants of time within the previous period of time. The method further includes mapping the difference to an anomalous behavior of the component over the current period of time, the anomalous behavior providing a diagnosis of the root cause of the problem.

Additionally, some embodiments of the improved technique are directed to an apparatus constructed and arranged to diagnose a root cause of a problem in a component of a data storage system. The apparatus includes memory and a set of processors coupled to the memory to form controlling circuitry. The controlling circuitry is constructed and arranged to carry out a method of diagnosing a root cause of a problem in a component of a data storage system.

Furthermore, some embodiments of the improved technique are directed to a computer program product having a non-transitory computer-readable storage medium which stores code including a set of instructions which, when executed by a data storage system, cause the data storage system to diagnose a root cause of a problem in a component of a data storage system.

In some arrangements, prior to collecting the current state data, the method includes collecting the previous state data from the component over the previous time period, and storing the previous state data in the storage.

In some arrangements, collecting the previous state data includes sampling the previous state data at substantially equal time intervals to form time series of the parameters over the previous period of time. Storing the previous data in storage includes saving the time series in the storage.

In some arrangements, collecting the previous state data includes accessing log files from storage within the data storage system, each log file providing a set of events and times at which each of the set of events occurred, and matching each of the set of events provided by a log file with previous state data of the component at an instant of time within the previous period of time according to the time at which that event occurred.

In some arrangements, collecting the previous state data further includes accessing configuration files from storage within the data storage system, each configuration file providing values of a set of configuration parameters that define the configuration of the component.

In some arrangements, storing the previous data in storage includes, for each instant of time within the previous period of time, placing the previous value of the parameters of the component at that instant of time in an entry of a database in the storage, placing the event matched to that instant of time in the entry of the database, and placing the values of the set of configuration parameters that define the configuration of the component in the entry of the database.

In some arrangements, the log files also provide, for each of the set of events, a metric indicating whether the event is a critical event. Placing the event matched to that instant of time in the entry of the database includes storing that event with the previous values of the parameters at the instant of time within the previous period in the entry of the database when the event is a critical event, and not storing that event with the previous values of the parameters at the instant of time within the previous period in the entry of the database when the event is not a critical event.

In some arrangements, the current state data includes a current event and current values of the set of configuration parameters. Extracting the previous state data of the component over the previous period of time includes locating the entries of the database that include the current event and the current values of the set of configuration parameters, and obtaining the previous values of the parameters in the located entries.

In some arrangements, storing the previous state data in the storage includes performing a normalization operation on the previous values of the parameters, the normalization operation causing each parameter of the set of parameter to have values to be taken from a specified numerical range. Performing the comparison operation on the current state data and the previous state data includes, prior to generating the comparison result, performing the normalization operation on the current values of the parameters.

In some arrangements, storing the previous state data in the storage includes performing a filtering operation on the previous values of the parameters, the filtering operation causing each parameter of the set of parameter to have values that have a minimum signal to noise ratio over the previous period of time. Performing the comparison operation on the current state data and the previous state data includes, prior to generating the comparison result, performing the filtering operation on the current values of the parameters.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

DETAILED DESCRIPTION

An improved technique involves mapping differences between current data collected from a component and previous data collected from the component to anomalous behavior of the component. A central diagnosis server collects previous state data such as disk or CPU utilization from components of various data storage systems it supports. The server may store this data, indexed by identifiers such as events linked to the state data, in a central database for later reference. The server then compares current state data being received from a particular data storage system to previous state data stored in the database. In some arrangements, the server selects previous state data based on matching event identifiers corresponding to the current state data and previous state data. The central diagnosis server then determines anomalous behavior based on the difference between current and previous state data.

Figure 1:
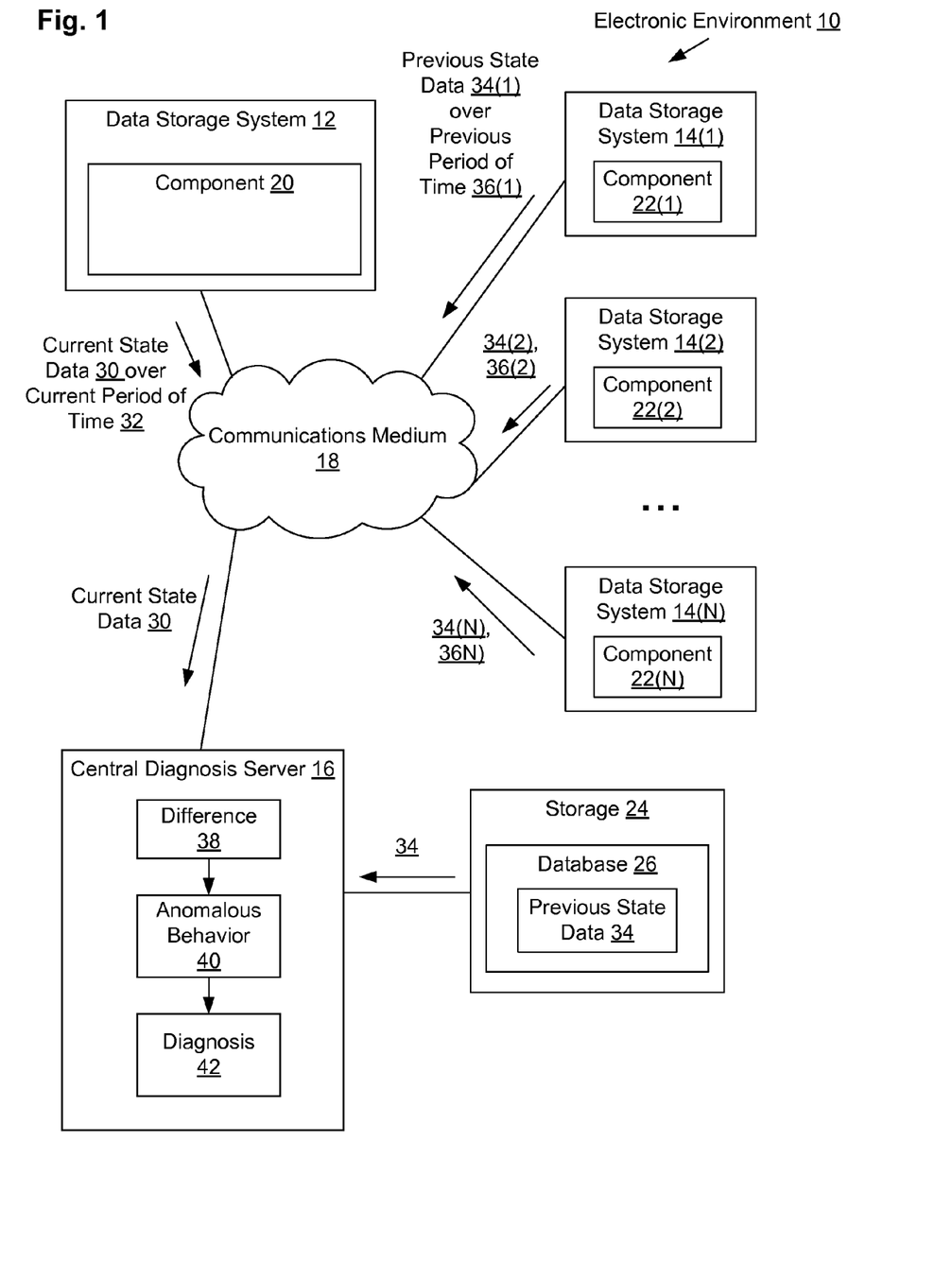
FIG. 1 is a block diagram illustrating an example electronic environment in which the improved technique may be carried out.

FIG. 1 illustrates an example electronic environment 10 in which the improved techniques are carried out. Electronic environment 10 includes data storage system 12 which may have an issue to be diagnosed; data storage systems 14(1), 14(2), . . . , 14(N) from which previous state data 34(1), 34(2), . . . , 34(N) (previous state data 34) has been extracted and stored; central diagnosis server 16, communications medium 18, and storage 24.

Data storage systems 12 and 14(1), 14(2), . . . , 14(N) are each constructed and arranged to store previous state data 34 in disks and provide access to previous state data 34. Each system 12 and 14(1), 14(2), . . . , 14(N) contain various components 20 and 22(1), . . . , 22(N), respectively, such as disks arranged in disk arrays (e.g., RAID-n arrays) and storage processors.

Components 20 and 22(1), . . . , 22(N) generate state data 30 and 34, respectively, that central diagnosis server 16 uses to evaluate anomalous behavior. It should be understood that, while the data storage systems 12 and 14(1), 14(2), . . . , 14(N) each are illustrated with a single component, in reality each such data storage system 12, 14(1), 14(2), . . . , 14(N) would have many different components.

Communications medium 18 provides network connections between data storage systems 12 and 14(1), 14(2), . . . , 14(N) and central diagnosis server 16. Communications medium 18 may implement a variety of protocols such as TCP/IP, UDP, ATM, Ethernet, Fibre Channel, combinations thereof, and the like. Furthermore, communications media 18 may include various components (e.g., cables, wireless, switches/routers, gateways/bridges, NAS/SAN appliances/nodes, interfaces, etc.). Moreover, the communications medium 18 are capable of having a variety of topologies (e.g., queue manager-and-spoke, ring, backbone, multi drop, point to-point, irregular, combinations thereof, and so on).

Central diagnosis server 16 is constructed and arranged to access state data from data storage systems 12 and 14(1), 14(2), . . . , 14(N). Central diagnosis server 16 is also constructed and arranged to determine anomalous behavior of components of data storage system 12 by comparing state data from those components with previous state data accessed from data storage systems 14(1), 14(2), . . . , 14(N) and stored in storage 24. In some arrangements, central diagnosis server 16 accesses log files and configuration files from data storage systems 12 and 14(1), 14(2), . . . , 14(N) in order to match events occurring at the components to state data.

Storage 24 is connected to central diagnosis server over, e.g., a fibre channel connection, and is constructed and arranged to store previous state data 34 accessed from data storage systems 14(1), 14(2), . . . , 14(N). Storage 24 is also constructed and arranged to provide central diagnosis server 16 access to previous state data 34. In some arrangements, storage 24 maintains previous state data 34 in a database 26.

Database 26 is configured to arrange previous state data 34 in searchable entries. For example, central diagnosis server 26 may store previous state data 34 in entries with fields having values of, e.g., utilization parameters, event identifiers, and configuration parameters.

During operation, central diagnosis server 16 acquires previous state data 34 over some previous period of time 36. For example, as a matter of course, central diagnosis server 16 acquires, e.g., access time data 34(1) from a disk of data storage system 14(1) over some period of time 36(1), e.g., one hour. Over this time, this disk may experience some activity, e.g., read and write commands which affect the value of the access time data 34(1) (because of storage or CPU utilization). Consequently, the access time data 34(1) presents a temporal profile over the period of time that varies as events (e.g., reads and writes) occur at the disk.

In some arrangements, central diagnosis server 16 acquires other data such as log files and configuration files associated with the disk from data storage system 14(1). In this case, central diagnosis server 16 correlates events stored in log files and previous state data 34(1), and stored the correlated events and data in database 36. Further details about such correlations are discussed below in connection with FIGS. 3 and 4.

As central diagnosis server 16 acquires previous state data 34(1), central diagnosis server 16 stores previous state data 34(1) in storage. In some arrangements, when central diagnosis server 16 performs correlations of previous state data 34(1) with events stored in log files, central diagnosis server 16 places previous state data 34(1) and correlated events into entries of database 26.

At a later point in time, central diagnosis server 12 acquires current state data 30 (e.g., access time data) from a component (e.g., a disk) from data storage system 12. In some arrangements, central diagnosis server 16 acquires current state data 30 in response to a request to diagnose the root cause of an issue with the component. In other arrangements, however, central diagnosis server 16 acquires data 30 according to a schedule.

To perform a diagnosis of an issue with the component of data storage system 12, central diagnosis server 16 accesses previous state data 34(1) in storage 24 and compares current state data 30 with previous state data 34(1). Specifically, central diagnosis server 16 computes a difference 38 between current state data 30 and previous state data 34(1). Because the comparison between current state data 30 and previous state data 34(1) should be based on analogous situations, e.g., same events, in some arrangements, central diagnosis server 16 performs a lookup in a database by, e.g., event identifier and compares previous state data 34 and current state data 30 corresponding to the same event.

Once central diagnosis server 16 generates difference 38, central diagnosis server 16 maps difference 38 to some anomalous behavior 40 of the component of data storage system 12. It is assumed that previous state data 34(1) corresponds to normal behavior of that component within data storage system 14(1), so that deviations from state data 34(1) under the same conditions (e.g., configured the same) imply anomalous behavior 40 characteristic of some defect.

For example, suppose that previous state data 34(1) indicated that, in response to a particular event (e.g., replication request received), the disk of data storage system 14(1) exhibited an increase in data access time by 10% during a period of time. Suppose further that in response to the same event, current state data 30 collected from the disk of data storage system 12 exhibited an increase in data access time by 100% during an equivalent period of time. The difference 38 indicates an anomaly 40 indicating a substantial increase in access time during replication.

Upon identifying anomaly 40, central diagnosis server 16 enables a diagnosis 42 to be made based on anomaly 40 and other factors such as an event identifier.

Further details of central diagnosis server 16 are described below in connection with FIG. 2.

Figure 2:
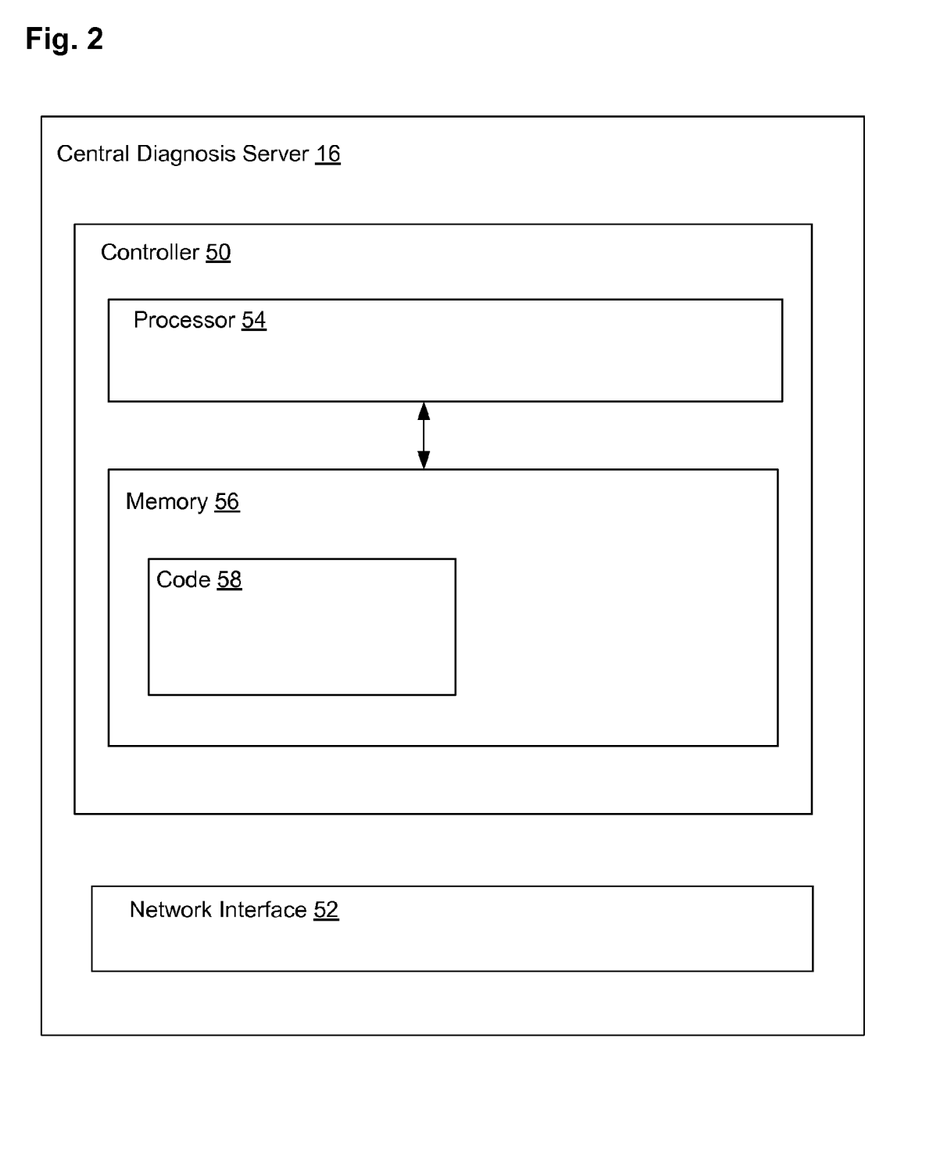
FIG. 2 is block diagram illustrating an example central diagnosis server within the electronic environment shown in FIG. 1.

FIG. 2 illustrates central diagnosis server 16. Central diagnosis server 16 includes controller 50, which in turn includes processor 54 and memory 56; and network interface 52.

Network interface 52 takes the form of an Ethernet card; in some arrangements, network interface 52 takes other forms including a wireless receiver and a token ring card. In other arrangements, network interface 52 includes an interface for fiber channel or backplane communications.

Memory 56 stores code 58 that contains instructions to diagnose a root cause of a problem in a component of data storage system 12. Memory 56 generally takes the form of, e.g., random access memory, although in some arrangements memory 56 includes flash memory or a non-volatile memory.

Processor 54 takes the form of, but is not limited to, Intel or AMD-based MPUs, and can include a single or multiple cores each running single or multiple threads. Processor 54 is coupled to memory 56 and is configured to execute instructions from code 58.

During operation, processor 54 receives previous state data 34(i) from a data storage system 14(i) over network interface 52. In some arrangements, previous state data 34(i) includes values of metrics that indicate usage of a component of data storage system 14(i), as well as data from event logs and configuration files. Further detail about how processor 54 uses such data is described below in connection with FIG. 3.

Figure 3:
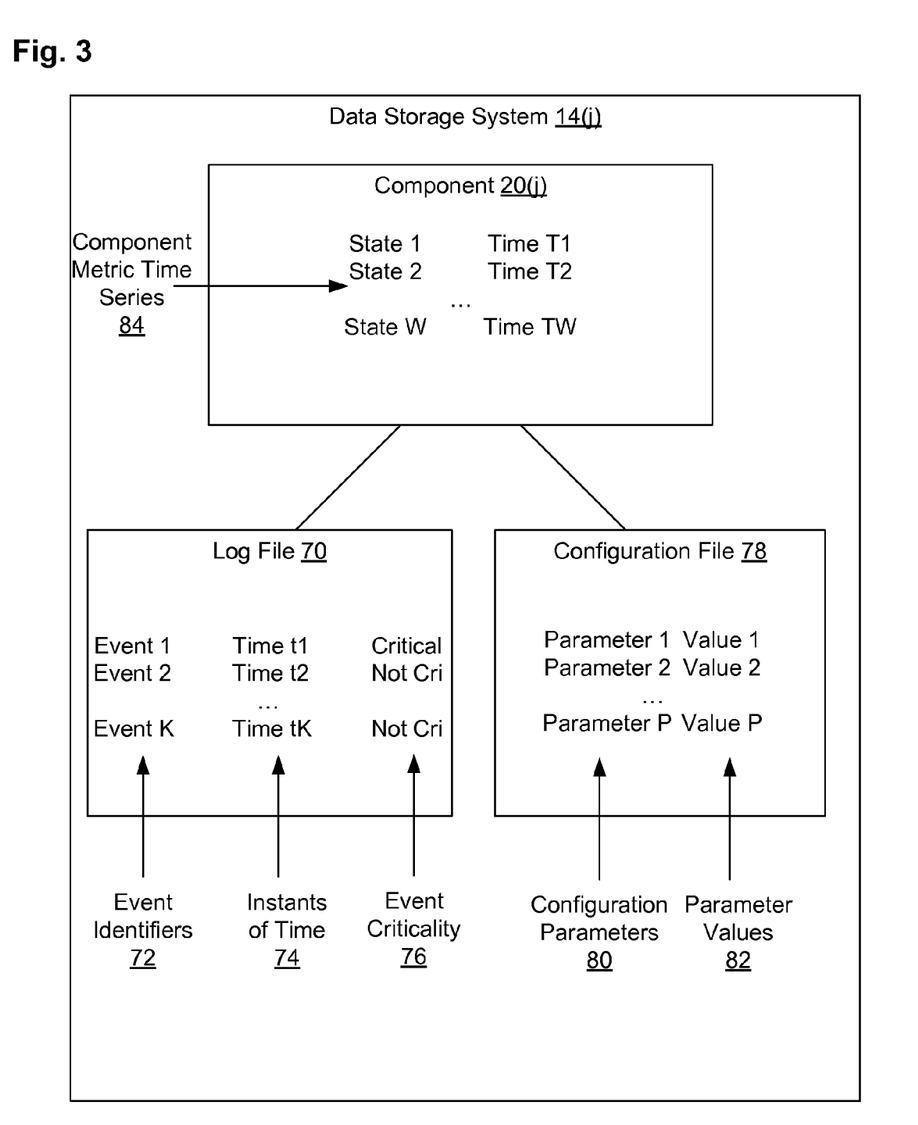
FIG. 3 is block diagram illustrating an example data storage system within the electronic environment shown in FIG. 1.

FIG. 3 illustrates an example data storage system 14(i) within electronic environment 10. Data storage system 14(i) stores, as previous state data 34, metric data 84 concerning component 20(i). Data storage system 14(i) also stores log file 70 and configuration file 78.

Metric data 84 includes various states of component 22(i) at corresponding instants of time. For example, as illustrated in FIG. 3, State 1 may include a value of a storage utilization parameter at time T1. It should be understood that, in some arrangements, metric data 84 is sampled at even intervals in time and may therefore be stored as a time series.

Log file 70 is configured to store events that occurred at component 22 at various times. Log file 70 includes a set of event identifiers 72 and instants of time 74 at which the events occurred at component 22(i). In some arrangements, log file 70 includes a notation as to whether the event identifier indicates a critical event 76.

In some arrangements, central diagnosis server 16 also acquires a configuration file 78 for component 22(i) from data storage system 14(i). Configuration file 78 includes a set of configuration parameter identifiers 80 and configuration parameter values 82. Configuration parameter values 82 provide further identification of component 22(i), as it would not make sense to draw conclusions about the behavior of a component configured differently from a component of interest.

It should be understood that the instants of time 74 and the instants of times at which states were recorded in metric time series 84 are not the same. Thus, as central diagnosis server 16 acquires log file 70 and component metric data 84 and correlates events and component metric data caused by those events, central diagnosis server 16 may perform some operations on the metric data and times. Further details regarding these operations are discussed below in connection with FIG. 4.

Figure 4:
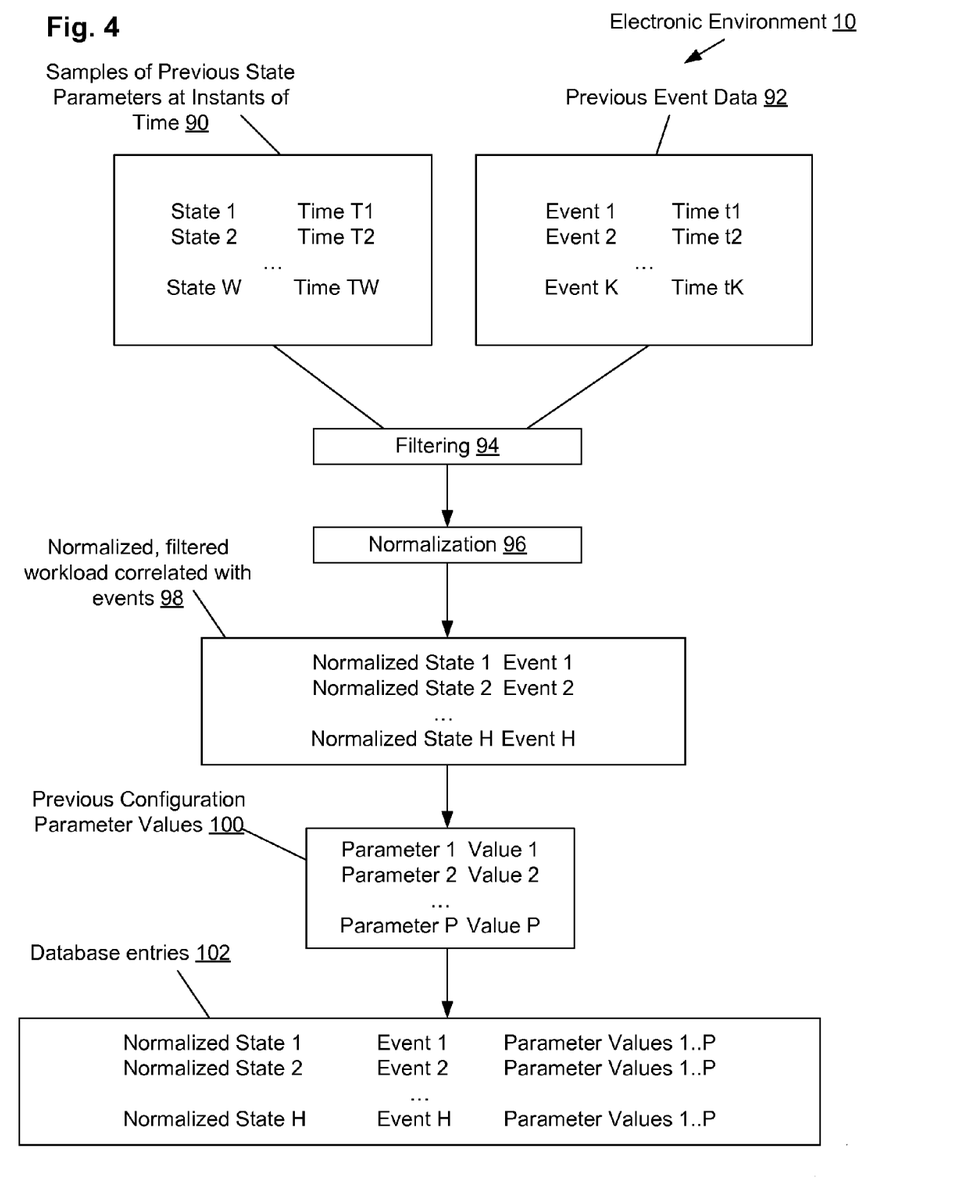
FIG. 4 is a block diagram illustrating another perspective of the electronic environment shown in FIG. 1.

FIG. 4 illustrates another perspective of example electronic environment 10, upon acquiring previous state data described in FIG. 3 from a component 22(i) of data storage system 14(i). In this illustration, central diagnosis server 16 places this data into database 16 for later reference.

From component metric data 84, central diagnosis server 16 considers particular samples of previous state parameters at instants of time 90 (e.g., T1, T2, . . . , TW, corresponding to state 1, state 2, . . . , state W). The idea is to match events in previous event data 92 taken from log file 70 to metric data 84 at instants of time 90, so that there is a list of events and corresponding states of component 22(i).

For example, central diagnosis server 16 considers the endpoints of the time interval between T1 and TW, i.e., instants of time 90. From previous event data, central diagnosis server 16 considers events corresponding to times slightly before T1 and slightly after TW, For example, suppose that time t1 is slightly before T1 and time tK is slightly after TW. Then central diagnosis server 16 maps each event identifier of previous event data 92 to a state, i.e., values of previous state parameters. The result is a list of states and corresponding event identifiers at each instant of time 90.

In some arrangements, central diagnosis server 16 performs a filtering operation 94 that increases the signal-to-noise ratio of the values of the previous state parameters of previous event data 92. Removing noise from these values provides a measure of accuracy when differencing this data with current state data 30. For example, filtering operation 94 may involve averaging the data, fitting the data to an expected profile based on the event identifiers, and so on.

In some arrangements, central diagnosis server 16 performs a normalization operation 96 that maps the values of component parameters to a number within a specified interval, say, 0 to 1.

The result of these steps is a set of normalized, filtered states 98 correlated with the events that ostensibly caused these states.

Central diagnosis server 16 provides further identification of these states by accessing configuration file 78 to obtain previous configuration parameter values 100. Central diagnosis server 16 then places the set of normalized, filtered states 98 and the corresponding events, as well as the previous configuration parameter values 100, into entries 102 of database 26. This previous data acquired from one component 22(i) of one data storage system 14(i) is now ready for comparison with new data from the same component of another data storage system 12 for detecting anomalies for root cause diagnosis. A manner in which this anomaly detection is carried out is described below in connection with FIG. 5.

Figure 5:
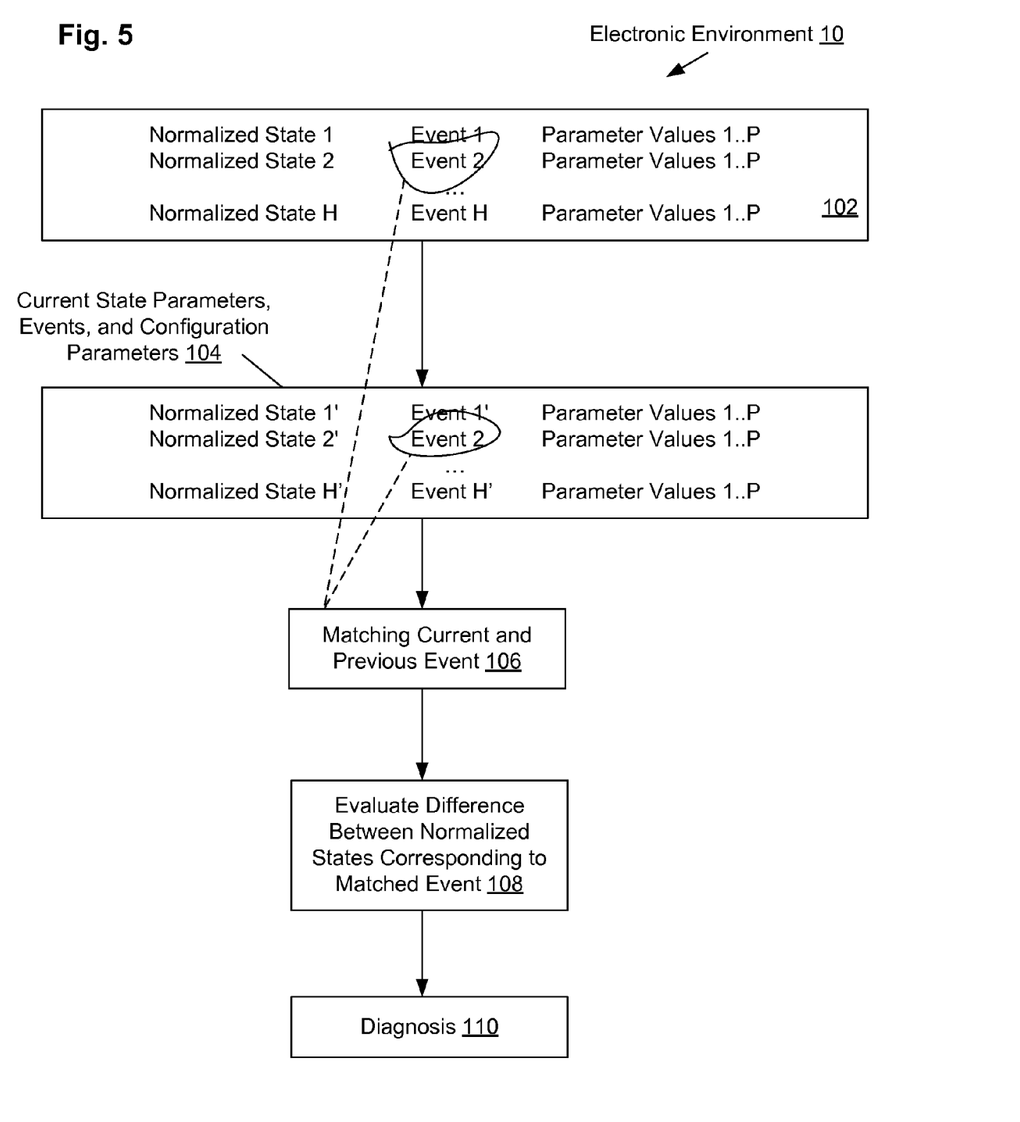
FIG. 5 is a block diagram illustrating another perspective of the electronic environment shown in FIG. 1.

FIG. 5 is another perspective of electronic environment 10 in which central diagnosis server 16 acquires current state data 30 from component 20 of data storage system 12. Current state data 30 includes current state parameter values, corresponding events, and configuration parameters 104; central diagnosis server 16 puts this data together from acquired log files and configuration files from data storage system 12 as described in FIG. 4.

Central diagnosis server 16 performs a matching operation 106 in database 26 by event identifier and configuration parameter values. By matching the same events with identically configured components, central diagnosis server can expect that values of the state parameters 28 should be substantially the same. When this data has been filtered and normalized, the effect of noise in the data is minimized and any differences may be attributed to anomalies in the behavior of component 20.

Upon finding a match, central diagnosis server 16 performs a difference operation 108 in which it evaluates the difference between the normalized values of the state parameters 28. Any significant difference (larger than some specified threshold) implies anomalous behavior of component 20, from which a diagnosis 110 of the root cause of the anomalous behavior may be deduced.

It should be understood that, in some arrangements, more than one match may be found, as database 26 holds state, event, and configuration data from any number of components of data storage systems. If there is more than one difference in state parameter values, then ostensibly one of the previous state data sets corresponded to a defective component, which defect should have been diagnosed and recorded. In this way, central diagnosis server 16 is able to provide diagnoses based on data from multiple sources.

Figure 6:
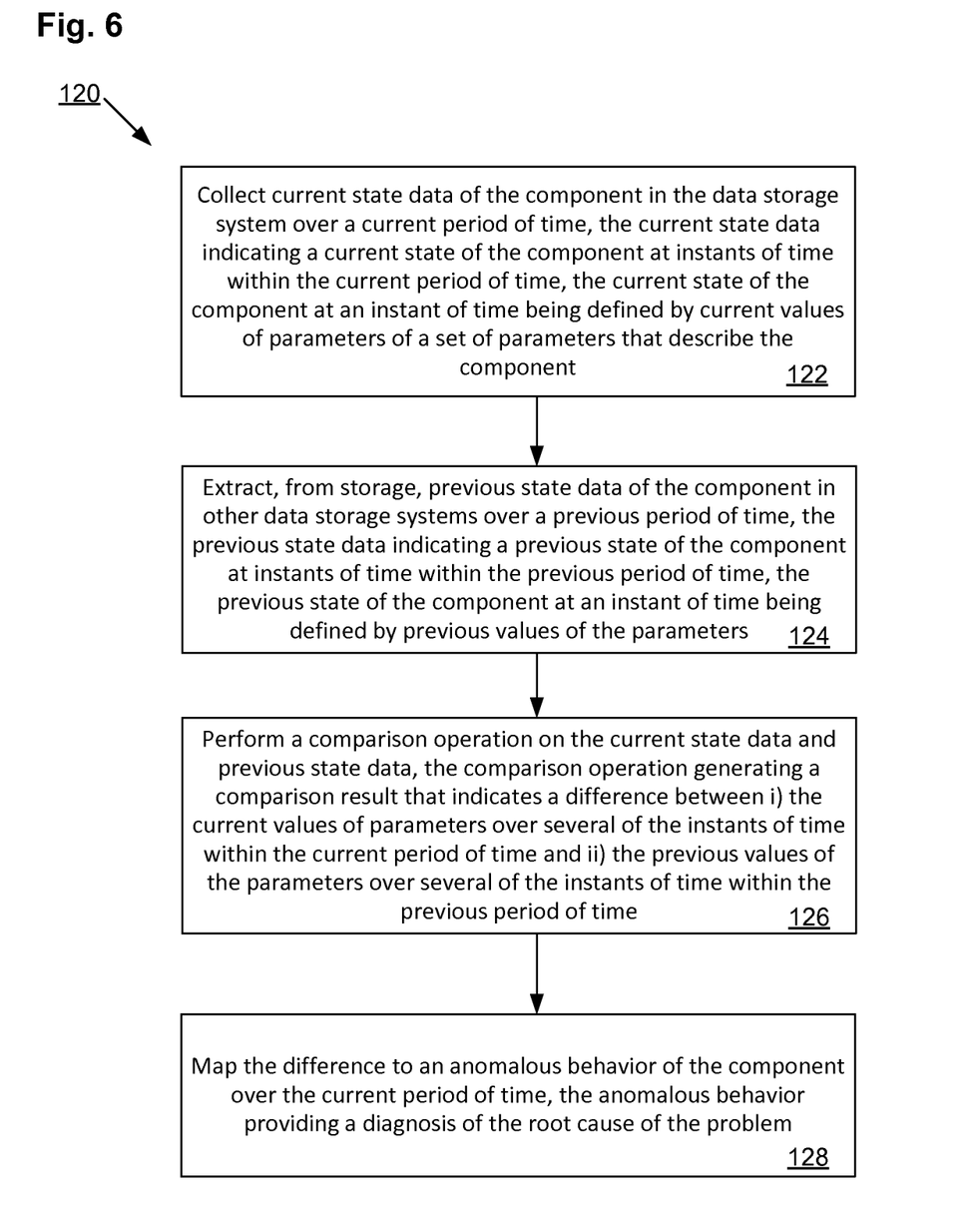
FIG. 6 is a flow chart illustrating an example method of carrying out the improved technique within the electronic environment shown in FIG. 1.

FIG. 6 illustrates a method 120 of diagnosing a root cause of a problem in a component of a data storage system, including steps 122, 124, 126, and 128.

In step 122, a server, e.g., central diagnosis server 16, collects current state data, e.g., current data 30, of a component, e.g., component 20, in a data storage system, e.g., data storage system 12, over a current period of time, e.g., current period of time 32, the current state data indicating a current state of the component at instants of time, e.g., instants of time 90, within the current period of time, the current state of the component at an instant of time being defined by current values of parameters of a set of parameters, e.g., parameters 28(1), . . . , 28(M), that describe the component.

In step 124, the server extracts, from storage, e.g., storage 24, previous state data, e.g., previous state data 34(1) of the component, e.g., component 22(1), in other data storage systems, e.g., data storage system 14(1), over a previous period of time, e.g., 36(1), the previous state data indicating a previous state of the component at instants of time within the previous period of time, the previous state of the component at an instant of time being defined by previous values of the parameters.

In step 126, the server performs a comparison operation, e.g., difference operation 108, on the current state data and previous state data, the comparison operation generating a comparison result, e.g., difference 38, that indicates a difference between i) the current values of parameters over several of the instants of time within the current period of time and ii) the previous values of the parameters over several of the instants of time within the previous period of time.

In step 128, the server maps the difference to an anomalous behavior, e.g., anomaly 40, of the component over the current period of time, the anomalous behavior providing a diagnosis, e.g., diagnosis 40, of the root cause of the problem.

As used throughout this document, the words "comprising," "including," and "having" are intended to set forth certain items, steps, elements, or aspects of something in in that these are provided by way of example only and the invention is not limited to these particular embodiments. In addition, the word "set" as used herein indicates one or more of something, unless a statement is made to the contrary.

Having described certain embodiments, numerous alternative embodiments or variations can be made. For example, the above discussion has dealt mainly with central diagnosis servers that detect anomalous behavior in components of data storage systems from state data acquired in response to a service call. In some arrangements, however, the diagnosis servers may simply acquire such state data on a continuous or periodic basis.

Also, the improvements or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like. Multiple computer-readable media may be used.

The medium (or media) may be encoded with instructions which, when executed on one or more computers or other processors, perform methods that implement the various processes described herein. Such medium (or media) may be considered an article of manufacture or a machine, and may be transportable from one machine to another.

Further, although features are shown and described with reference to particular embodiments hereof, such features may be included in any of the disclosed embodiments and their variants. Thus, it is understood that features disclosed in connection with any embodiment can be included as variants of any other embodiment, whether such inclusion is made explicit herein or not.

Those skilled in the art will therefore understand that various changes in form and detail may be made to the embodiments disclosed herein without departing from the scope of the invention.

What is claimed is:

1. A method of diagnosing a root cause of a problem in a component of a data storage system, the method comprising:
   collecting current state data of the component in the data storage system over a current period of time, the current state data indicating a current state of the component at instants of time within the current period of time, the current state of the component at an instant of time being defined by current values of parameters of a set of parameters that describe the component;
   extracting, from storage, previous state data of the component in other data storage systems over a previous period of time, the previous state data indicating a previous state of the component at instants of time within the previous period of time, the previous state of the component at an instant of time being defined by previous values of the parameters;
   performing a comparison operation on the current state data and previous state data, the comparison operation generating a comparison result that indicates a difference between i) the current values of parameters over several of the instants of time within the current period of time and ii) the previous values of the parameters over several of the instants of time within the previous period of time; and
   mapping the difference to an anomalous behavior of the component over the current period of time, the anomalous behavior providing a diagnosis of the root cause of the problem.

2. A method as in claim 1, further comprising, prior to collecting the current state data:
   collecting the previous state data from the component over the previous time period; and
   storing the previous state data in the storage.

3. A method as in claim 2,
   wherein collecting the previous state data includes:
      sampling the previous state data at substantially equal time intervals to form time series of the parameters over the previous period of time; and
   wherein storing the previous data in storage includes:
      saving the time series in the storage.

4. A method as claim 2,
   wherein collecting the previous state data includes:
      accessing log files from storage within the data storage system, each log file providing a set of events and times at which each of the set of events occurred, and matching each of the set of events provided by a log file with previous state data of the component at an instant of time within the previous period of time according to the time at which that event occurred.

5. A method as in claim 4,
   wherein collecting the previous state data further includes:
      accessing configuration files from storage within the data storage system, each configuration file providing values of a set of configuration parameters that define the configuration of the component.

6. A method as in claim 5,
   wherein storing the previous data in storage includes, for each instant of time within the previous period of time:
      placing the previous value of the parameters of the component at that instant of time in an entry of a database in the storage,
      placing the event matched to that instant of time in the entry of the database, and
      placing the values of the set of configuration parameters that define the configuration of the component in the entry of the database.

7. A method as in claim 6,
   wherein the log files also provide, for each of the set of events, a metric indicating whether the event is a critical event; and
   wherein placing the event matched to that instant of time in the entry of the database includes:
      storing that event with the previous values of the parameters at the instant of time within the previous period in the entry of the database when the event is a critical event, and
      not storing that event with the previous values of the parameters at the instant of time within the previous period in the entry of the database when the event is not a critical event.

8. A method as in claim 6,
   wherein the current state data includes a current event and current values of the set of configuration parameters;
   wherein extracting the previous state data of the component over the previous period of time includes:
      locating the entries of the database that include the current event and the current values of the set of configuration parameters, and
      obtaining the previous values of the parameters in the located entries.

9. A method as in claim 6,
   wherein storing the previous state data in the storage includes:
      performing a normalization operation on the previous values of the parameters, the normalization operation causing each parameter of the set of parameter to have values to be taken from a specified numerical range; and
   wherein performing the comparison operation on the current state data and the previous state data includes:
      prior to generating the comparison result, performing the normalization operation on the current values of the parameters.

10. A method as in claim 6,
    wherein storing the previous state data in the storage includes:
       performing a filtering operation on the previous values of the parameters, the filtering operation causing each parameter of the set of parameter to have values that have a minimum signal to noise ratio over the previous period of time; and
    wherein performing the comparison operation on the current state data and the previous state data includes:
       prior to generating the comparison result, performing the filtering operation on the current values of the parameters.

11. A method as in claim 1, further comprising, prior to performing the comparison operation on the current state data and the previous state data:
- performing a normalization operation on the previous values of the parameters to produce normalized previous values of the parameters, the normalization operation causing each parameter of the set of parameter to have values to be taken from a specified numerical range;
- performing a filtering operation on the normalized previous values of the parameters to produce filtered values of the parameters, the filtering operation causing each parameter of the set of parameter to have values that have a minimum signal to noise ratio over the previous period of time.

12. A method as in claim 11, wherein performing the filtering operation on the normalized previous values of the parameters includes fitting the normalized previous values of the parameters to an expected profile.

13. A method as in claim 1, wherein collecting the current state data over the current period of time includes obtaining multiple current states of the component, each of the multiple current states of the component being defined by current values of the parameters at a different respective instant of time within the current period of time.

14. A method as in claim 1, wherein the comparison operation is performed at a central diagnosis server accessible to and apart from the data storage system and the other data storage systems.

15. An electronic apparatus constructed and arranged to diagnose a root cause of a problem in a component of a data storage system, the apparatus comprising:
- a network interface;
- memory; and
- a controller including controlling circuitry coupled to the memory, the controlling circuitry being constructed and arranged to:
  - collect current state data of the component in a data storage system over a current period of time, the current state data indicating a current state of the component at instants of time within the current period of time, the current state of the component at an instant of time being defined by current values of parameters of a set of parameters that describe the component;
  - extract, from storage, previous state data of the component in other data storage systems over a previous period of time, the previous state data indicating a previous state of the component at instants of time within the previous period of time, the previous state of the component at an instant of time being defined by previous values of the parameters;
  - perform a comparison operation on the current state data and previous state data, the comparison operation generating a comparison result that indicates a difference between i) the current values of parameters over several of the instants of time within the current period of time and ii) the previous values of the parameters over several of the instants of time within the previous period of time; and
  - map the difference to an anomalous behavior of the component over the current period of time, the anomalous behavior providing a diagnosis of the root cause of the problem.

16. An apparatus as in claim 15, wherein the controlling circuitry is further constructed and arranged to, prior to collecting the current state data:
- collect the previous state data from the component over the previous time period; and
- store the previous state data in the storage.

17. An apparatus as in claim 16,
wherein the controlling circuitry constructed and arranged to collect the previous state data is further constructed and arranged to:
- sample the previous state data at substantially equal time intervals to form time series of the parameters over the previous period of time; and wherein the controlling circuitry constructed and arranged to store the previous data in storage is further constructed and arranged to:
- save the time series in the storage.

18. An apparatus as claim 16,
wherein the controlling circuitry constructed and arranged to collect the previous state data is further constructed and arranged to:
- access log files from storage within the data storage system, each log file providing a set of events and times at which each of the set of events occurred, and
- match each of the set of events provided by a log file with previous state data of the component at an instant of time within the previous period of time according to the time at which that event occurred.

19. An apparatus as in claim 18,
wherein the controlling circuitry constructed and arranged to collect the previous state data is further constructed and arranged to:
- access configuration files from storage within the data storage system, each configuration file providing values of a set of configuration parameters that define the configuration of the component.

20. An apparatus as in claim 19,
wherein the controlling circuitry constructed and arranged to store the previous data in storage is further constructed and arranged to, for each instant of time within the previous period of time:
- place the previous value of the parameters of the component at that instant of time in an entry of a database in the storage,
- place the event matched to that instant of time in the entry of the database, and
- place the values of the set of configuration parameters that define the configuration of the component in the entry of the database.

21. An apparatus as in claim 20,
wherein the log files also provide, for each of the set of events, a metric indicating whether the event is a critical event; and
wherein the controlling circuitry constructed and arranged to place the event matched to that instant of time in the entry of the database is further constructed and arranged to:
- store that event with the previous values of the parameters at the instant of time within the previous period in the entry of the database when the event is a critical event, and
- not store that event with the previous values of the parameters at the instant of time within the previous period in the entry of the database when the event is not a critical event.

22. An apparatus as in claim 20,
wherein the current state data includes a current event and current values of the set of configuration parameters;
wherein the controlling circuitry constructed and arranged to extract the previous state data of the component over the previous period of time is further constructed and arranged to:
  locate the entries of the database that include the current event and the current values of the set of configuration parameters, and
  obtain the previous values of the parameters in the located entries.

23. An apparatus as in claim 20,
wherein the controlling circuitry constructed and arranged to store the previous state data in the storage is further constructed and arranged to:
  perform a normalization operation on the previous values of the parameters, the normalization operation causing each parameter of the set of parameter to have values to be taken from a specified numerical range; and
wherein the controlling circuitry constructed and arranged to perform the comparison operation on the current state data and the previous state data is further constructed and arranged to:
  prior to generating the comparison result, perform the normalization operation on the current values of the parameters.

24. A computer program product comprising a non-transitory, computer-readable storage medium which stores instructions that, when executed by a controller, causes the controller to diagnose a root cause of a problem in a component of a data storage system by:
  collecting current state data of the component in the data storage system over a current period of time, the current state data indicating a current state of the component at instants of time within the current period of time, the current state of the component at an instant of time being defined by current values of parameters of a set of parameters that describe the component;
  extracting, from storage, previous state data of the component in other data storage systems over a previous period of time, the previous state data indicating a previous state of the component at instants of time within the previous period of time, the previous state of the component at an instant of time being defined by previous values of the parameters;
  performing a comparison operation on the current state data and previous state data, the comparison operation generating a comparison result that indicates a difference between i) the current values of parameters over several of the instants of time within the current period of time and ii) the previous values of the parameters over several of the instants of time within the previous period of time; and
  mapping the difference to an anomalous behavior of the component over the current period of time, the anomalous behavior providing a diagnosis of the root cause of the problem.

\* \* \* \* \*